(12) United States Patent
Duca et al.

(10) Patent No.: US 10,505,790 B2
(45) Date of Patent: Dec. 10, 2019

(54) APPARATUS AND METHOD FOR AUTOMATED EVENT NOTIFICATION READ RECEIPT TO SUPPORT NON-REPUDIATED AUDITING OR OTHER FUNCTIONS IN INDUSTRIAL PROCESS CONTROL AND AUTOMATION SYSTEM

(71) Applicant: Honeywell International Inc., Morris Plains, NJ (US)

(72) Inventors: Andrew Duca, Phoenix, AZ (US); Matthew G. Burd, Calgary (CA); Tyron Vardy, Nuthall (GB)

(73) Assignee: Honeywell International Inc., Morris Plains, NJ (US)

( * ) Notice: Subject to any disclaimer, the term of this patent is extended or adjusted under 35 U.S.C. 154(b) by 242 days.

(21) Appl. No.: 14/868,168

(22) Filed: Sep. 28, 2015

(65) Prior Publication Data

US 2016/0337166 A1    Nov. 17, 2016

Related U.S. Application Data

(60) Provisional application No. 62/161,548, filed on May 14, 2015, provisional application No. 62/161,536,
(Continued)

(51) Int. Cl.
*H04L 12/24* (2006.01)
*H04L 12/26* (2006.01)

(52) U.S. Cl.
CPC .......... *H04L 41/069* (2013.01); *H04L 41/22* (2013.01); *H04L 43/04* (2013.01); *H04L 43/08* (2013.01)

(58) Field of Classification Search
CPC ....... H04L 41/069; H04L 41/22; H04L 43/04; H04L 43/08
See application file for complete search history.

(56) References Cited

U.S. PATENT DOCUMENTS 6,941,557 B1    9/2005  Jakobson et al.
7,421,472 B1 *  9/2008  Ross, Jr. .............. G06Q 10/107
                                                709/206
(Continued)

FOREIGN PATENT DOCUMENTS

JP       2013-038601 A     2/2013
KR   10-2003-0021537 A     3/2003
(Continued)

OTHER PUBLICATIONS

Notification of Transmittal of the International Search Report and the Written Opinion of the International Searching Authority, or the Declaration dated Jul. 28, 2016 in connection with International Patent Application No. PCT/US2016/030012.
(Continued)

*Primary Examiner* — Uzma Alam

(57) ABSTRACT

A method includes transmitting a notification to a first end-user device, where the notification is associated with an event in an industrial process control and automation system. The method also includes receiving a first read receipt identifying when a user of the first end-user device opened the notification or viewed or read details about the notification at the first end-user device. In addition, the method includes storing the first read receipt or information related to the first read receipt in association with the notification and/or the event. The method could also include transmitting the notification to a second end-user device and transmitting a first indication to the second end-user device, where the first indication indicates that the user of the first end-user device opened the notification or viewed or read the details about the notification.

19 Claims, 8 Drawing Sheets

Related U.S. Application Data filed on May 14, 2015, provisional application No. 62/161,657, filed on May 14, 2015, provisional application No. 62/161,558, filed on May 14, 2015, provisional application No. 62/161,542, filed on May 14, 2015, provisional application No. 62/161,644, filed on May 14, 2015, provisional application No. 62/161,622, filed on May 14, 2015.

(56) References Cited

U.S. PATENT DOCUMENTS

| | | | |
|---|---|---|---|
| 7,539,724 B1* | 5/2009 | Callaghan | G05B 19/4185 709/205 |
| 2003/0131060 A1* | 7/2003 | Hartselle | G06Q 10/107 709/206 |
| 2005/0193075 A1* | 9/2005 | Haff | G06Q 10/107 709/206 |
| 2007/0297557 A1 | 12/2007 | Kuwatani | |
| 2008/0025479 A1* | 1/2008 | Pantana | H04L 51/36 379/88.13 |
| 2010/0082133 A1 | 4/2010 | Chouinard et al. | |
| 2011/0022662 A1* | 1/2011 | Barber-Mingo | G06Q 10/06 709/206 |
| 2011/0276165 A1 | 11/2011 | Ko et al. | |
| 2012/0029678 A1 | 2/2012 | McGreevy et al. | |
| 2012/0079282 A1 | 3/2012 | Lowenstein et al. | |
| 2012/0192076 A1* | 7/2012 | Rocca | G06Q 10/06311 715/738 |
| 2012/0307656 A1* | 12/2012 | Vyrros | H04L 12/1859 370/252 |
| 2013/0212186 A1* | 8/2013 | Camp | G05B 19/042 709/206 |
| 2013/0305164 A1* | 11/2013 | Karunamuni | G06Q 10/107 715/752 |
| 2014/0047107 A1 | 2/2014 | Maturana et al. | |
| 2014/0068107 A1* | 3/2014 | Rajapakse | H04N 21/2368 709/248 |
| 2014/0121789 A1 | 5/2014 | Brandes et al. | |
| 2014/0344369 A1* | 11/2014 | Goldberg | H04L 51/34 709/206 |
| 2014/0358574 A1* | 12/2014 | Tara | H04L 51/24 705/2 |
| 2015/0007265 A1 | 1/2015 | Aissi et al. | |
| 2015/0077263 A1 | 3/2015 | Ali et al. | |
| 2015/0180815 A1* | 6/2015 | Zhou | H04L 51/24 709/206 |
| 2015/0281453 A1* | 10/2015 | Maturana | H04M 3/5233 379/265.12 |

FOREIGN PATENT DOCUMENTS

| | | |
|---|---|---|
| KR | 10-1077591 B1 | 10/2011 |
| KR | 10-2012-0087235 A | 8/2012 |
| KR | 10-2013-0006760 A | 1/2013 |
| KR | 10-2014-0059788 A | 5/2014 |
| KR | 10-2014-0103859 A | 8/2014 |

OTHER PUBLICATIONS

Notification of Transmittal of the International Search Report and the Written Opinion of the International Searching Authority, or the Declaration dated Aug. 9, 2016 in connection with international Patent Application No. PCT/US2016/029758.

Notification of Transmittal of the International Search Report and the Written Opinion of the International Searching Authority, or the Declaration dated Jul. 28, 2016 in connection with International Patent Application No. PCT/US2016/029953.

Notification of Transmittal of the International Search Report and the Written Opinion of the International Searching Authority, or the Declaration dated Jul. 28, 2016 in connection with International Patent Application No. PCT/US2016/030037.

Notification of Transmittal of the International Search Report and the Written Opinion of the International Searching Authority, or the Declaration dated Aug. 9, 2016 in connection with International Patent Application No. PCT/US2016/030377.

Notification of Transmittal of the International Search Report and the Written Opinion of the International Searching Authority, or the Declaration dated Jul. 28, 2016 in connection with International Patent Application No. PCT/US2016/029984.

Product Overview, WIN-911 Software, Jan. 13, 2015, 2 pgs.
Product Overview, WIN-911 Enterprise Edition, Feb. 27, 2014, 2 pgs.
Product Data Sheet, WIN-911 Software, Mobile Edition, Smartphone Data Sheet, Sep. 25, 2015, 2 pgs.
Specter Instruments, WIN-911/Lite, Jan. 2005, 2 pgs.
Product Overview, WIN-911 Version 7, Feb. 11, 2014, 2 pgs.
Specter Instruments, Technical Brief, WEB-911 XTools, Jan. 26, 2009, 1 pg.
Technical Brief, "WIN-911 Version 7.17.00, Changes and Enhancements: General WIN-911: V6.18 to V7.17.00", Sep. 10, 2015, 15 pgs.
User's Manual, "WIN-911 V7.12", Oct. 11, 2011, 582 pgs.
Andrew Duca, "Apparatus and Method for Protecting Propietary Information Over Public Notification Infrastructure", U.S. Appl. No. 14/863,006, filed Sep. 23, 2015.
Matthew G. Burd et al., "Apparatus and Method for Universal Annotation in Industrial Process Control and Automation System", U.S. Appl. No. 14/866,857, filed Sep. 29, 2015.
Matthew G. Burd et al., "Apparatus and Method for Providing Event Context With Notifications Related to Industrial Process Control and Automation System", U.S. Appl. No. 14/868,058, filed Sep. 28, 2015.
Andrew Duca et al., "Apparatus and Method for Event Detection to Support Mobile Notifications Related to Industrial Process Control and Automation System", U.S. Appl. No. 14/868,905, filed Sep. 29, 2015.
Andrew Duca et al., "Apparatus and Method for Translating Industrial Process Control and Automation System Events Into Mobile Notifications", U.S. Appl. No. 14/869,629, filed Sep. 29, 2015.
Graeme Laycock et al., "Apparatus and Method for Using Configurable Rules Linking Triggers With Actions to Support Notifications Associated With Industrial Process Control and Automation System", U.S. Appl. No. 14/869,890, filed Sep. 29, 2015.

* cited by examiner

APPARATUS AND METHOD FOR AUTOMATED EVENT NOTIFICATION READ RECEIPT TO SUPPORT NON-REPUDIATED AUDITING OR OTHER FUNCTIONS IN INDUSTRIAL PROCESS CONTROL AND AUTOMATION SYSTEM

CROSS-REFERENCE TO RELATED APPLICATIONS AND PRIORITY CLAIM

This application claims priority under 35 U.S.C. § 119(e) to the following U.S. provisional patent applications:

U.S. Provisional Patent Application No. 62/161,536 filed on May 14, 2015 and entitled "APPARATUS AND METHOD FOR TRANSLATING INDUSTRIAL PROCESS CONTROL AND AUTOMATION SYSTEM EVENTS INTO MOBILE NOTIFICATIONS";

U.S. Provisional Patent Application No. 62/161,542 filed on May 14, 2015 and entitled "APPARATUS AND METHOD FOR USING CONFIGURABLE RULES LINKING TRIGGERS WITH ACTIONS TO SUPPORT NOTIFICATIONS ASSOCIATED WITH INDUSTRIAL PROCESS CONTROL AND AUTOMATION SYSTEM";

U.S. Provisional Patent Application No. 62/161,548 filed on May 14, 2015 and entitled "APPARATUS AND METHOD FOR AUTOMATED EVENT NOTIFICATION READ RECEIPT TO SUPPORT NON-REPUDIATED AUDITING IN INDUSTRIAL PROCESS CONTROL AND AUTOMATION SYSTEM";

U.S. Provisional Patent Application No. 62/161,558 filed on May 14, 2015 and entitled "APPARATUS AND METHOD FOR EVENT DETECTION TO SUPPORT MOBILE NOTIFICATIONS RELATED TO INDUSTRIAL PROCESS CONTROL AND AUTOMATION SYSTEM";

U.S. Provisional Patent Application No. 62/161,622 filed on May 14, 2015 and entitled "APPARATUS AND METHOD FOR PROTECTING PROPRIETARY INFORMATION OVER PUBLIC NOTIFICATION INFRASTRUCTURE";

U.S. Provisional Patent Application No. 62/161,644 filed on May 14, 2015 and entitled "APPARATUS AND METHOD FOR PROVIDING EVENT CONTEXT WITH NOTIFICATIONS RELATED TO INDUSTRIAL PROCESS CONTROL AND AUTOMATION SYSTEM"; and U.S. Provisional Patent Application No. 62/161,657 filed on May 14, 2015 and entitled "APPARATUS AND METHOD FOR UNIVERSAL ANNOTATION IN INDUSTRIAL PROCESS CONTROL AND AUTOMATION SYSTEM".

All of these provisional patent applications are hereby incorporated by reference in their entirety.

TECHNICAL FIELD

This disclosure relates generally to industrial process control and automation systems. More specifically, this disclosure relates to an apparatus and method for automated event notification read receipt to support non-repudiated auditing or other functions in an industrial process control and automation system.

BACKGROUND

Industrial process control and automation systems are often used to automate large and complex industrial processes. These types of systems routinely include sensors, actuators, and controllers. The controllers are often arranged hierarchically in a control and automation system. For example, lower-level controllers are often used to receive measurements from the sensors and perform process control operations to generate control signals for the actuators. Higher-level controllers are often used to perform higher-level functions, such as planning, scheduling, and optimization operations. Human operators routinely interact with controllers and other devices in a control and automation system, such as to review warnings, alarms, or other notifications and make adjustments to control or other operations.

SUMMARY

This disclosure provides an apparatus and method for automated event notification read receipt to support non-repudiated auditing or other functions in an industrial process control and automation system.

In a first embodiment, a method includes transmitting a notification to a first end-user device, where the notification is associated with an event in an industrial process control and automation system. The method also includes receiving a first read receipt identifying when a user of the first end-user device opened the notification or viewed or read details about the notification at the first end-user device. In addition, the method includes storing the first read receipt or information related to the first read receipt in association with the notification and/or the event.

In a second embodiment, an apparatus includes at least one interface configured to communicate with a first end-user device. The apparatus also includes at least one processing device configured to initiate transmission of a notification to the first end-user device, where the notification is associated with an event in an industrial process control and automation system. The at least one processing device is also configured to receive a first read receipt and store the first read receipt or information related to the first read receipt in association with the notification and/or the event. The first read receipt identifies when a user of the first end-user device opened the notification or viewed or read details about the notification at the first end-user device.

In a third embodiment, a non-transitory computer readable medium contains computer readable program code. The program code, when executed, causes at least one processing device to initiate transmission of a notification to a first end-user device, where the notification is associated with an event in an industrial process control and automation system. The program code, when executed, also causes the at least one processing device receive a first read receipt and store the first read receipt or information related to the first read receipt in association with the notification and/or the event. The first read receipt identifies when a user of the first end-user device opened the notification or viewed or read details about the notification at the first end-user device.

In a fourth embodiment, a non-transitory computer readable medium contains computer readable program code. The program code, when executed, causes at least one processing device of a mobile device to receive a notification associated with an event in an industrial process control and automation system at the mobile device. The program code, when executed, also causes the at least one processing device to receive user input associated with the notification at the mobile device, where the user input includes a request to open the notification or to view or read details about the notification. The program code, when executed, further causes the at least one processing device, in response to the user input, to present the details about the notification to the user and transmit a read receipt associated with the notification from the mobile device. The read receipt identifies when the user opened the notification or viewed or read the details about the notification.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
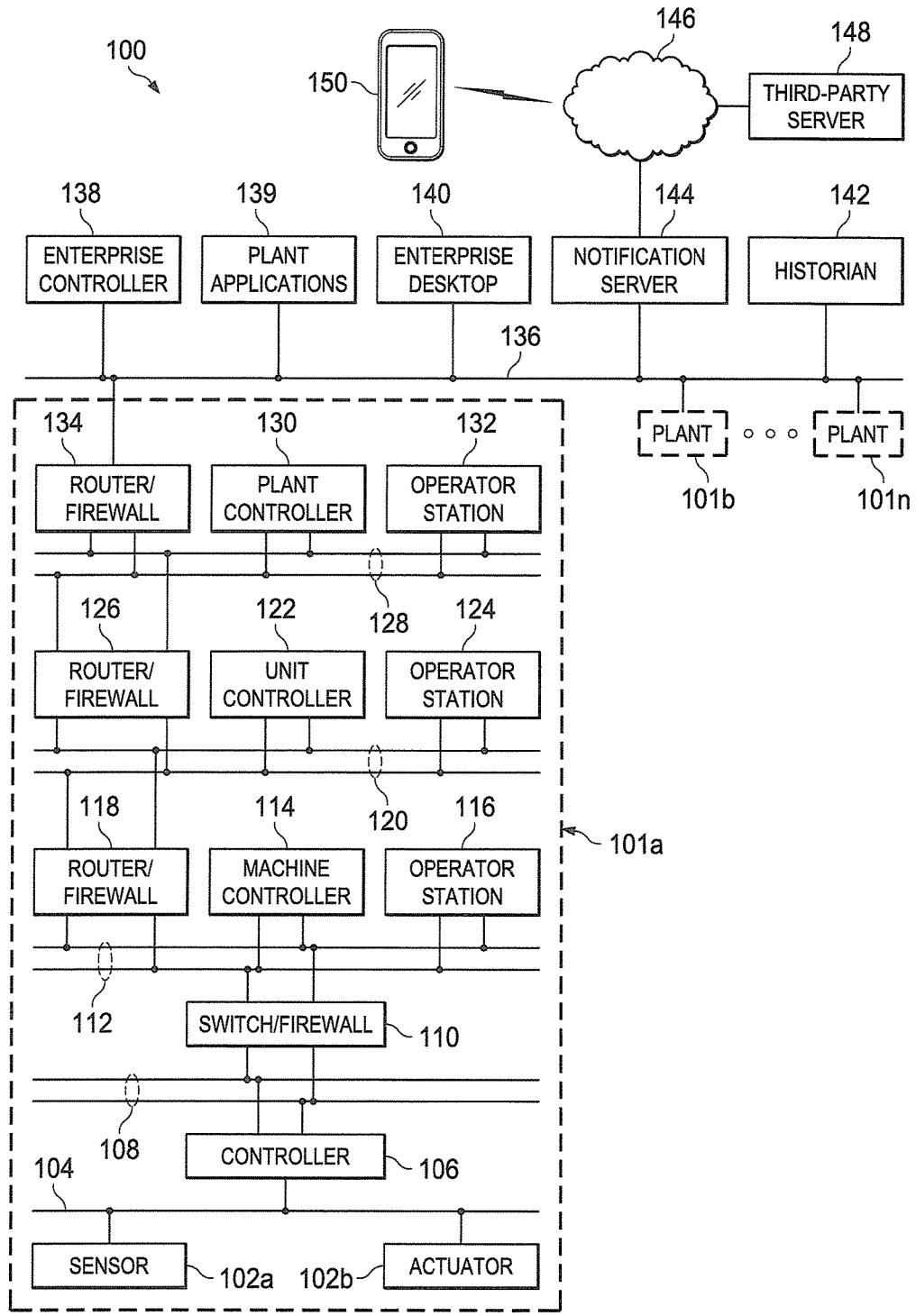
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102*b*. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102*a*, and actuators 102*b*).

One or more operator stations 116 are coupled to the networks 112. The operator stations 116 represent computing or communication devices providing user access to the machine-level controllers 114, which could then provide user access to the controllers 106 (and possibly the sensors 102*a* and actuators 102*b*). As particular examples, the operator stations 116 could allow users to review the operational history of the sensors 102*a* and actuators 102*b* using information collected by the controllers 106 and/or the machine-level controllers 114. The operator stations 116 could also allow the users to adjust the operation of the sensors 102*a*, actuators 102*b*, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Various plant applications 139 could also be executed in the system 100. In this example, the plant applications 139 are shown as residing on Level 5 of the system 100, although plant applications 139 could reside on other or additional levels of the system 100. The plant applications 139 could represent any suitable applications that are executed by server computers or other computing devices.

Access to the enterprise-level controllers 138 and plant applications 139 may be provided by one or more enterprise desktops (also referred to as operator stations) 140. Each of the enterprise desktops 140 includes any suitable structure for supporting user access and control of one or more components in the system 100. Each of the enterprise desktops 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 142 can be coupled to the network 136. The historian 142 could represent a component that stores various information about the system 100. The historian 142 could, for instance, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 and each of the operator stations 116, 124, 132, 140 could include one or more processing devices and one or more memories for storing instructions and data used, generated, or collected by the processing device(s). Each of the controllers 106, 114, 122, 130, 138 and each of the operator stations 116, 124, 132, 140 could also include at least one network interface, such as one or more Ethernet interfaces or wireless transceivers, facilitating communication over one or more networks or communication paths.

The widespread use of mobile "smart" devices (such as APPLE IPHONEs and IPADs and ANDROID devices) allows users to remain connected and to interact with remote computing devices from virtually anywhere each user travels. Among other things, this could allow personnel associated with an industrial process control and automation system to receive warnings, alerts, or other notifications associated with events and other information and trigger actions associated with the control and automation system, regardless of whether the personnel are physically located at an industrial site. For example, events that are generated in a process control and automation system are often presented to operators currently on shift in one or more control rooms. There may also typically be a need or desire to inform users outside of control rooms, outside of an industrial plant, or while off network of events that are happening in the control and automation system. These events can come from a variety of applications, such as from a distributed control system (DCS) itself, advanced process control applications, operations applications, or business applications. Delivery of notifications describing these events to a user's handheld mobile device enables the user to receive notifications virtually anywhere and at any time.

To support this functionality, the system 100 includes a notification server 144, which receives data from other component(s) of the system 100 and generates notifications for users. For example, the notification server 144 could receive information identifying different events that occur with the system 100. The events could be associated with any suitable activities or conditions in the system 100, such as the generation of warnings or alerts by other components in the system 100. The notification server 144 could receive this information in any suitable manner and from any suitable source(s), such as from a historian, controller, or plant application. The notification server 144 uses this information to generate notifications (such as push notifications) and other messages to be sent to appropriate users. The notification server 144 could also provide additional information to appropriate users in response to user interactions with those notifications or other messages.

The notification server 144 communicates over a third-party network 146 with a third-party server 148. The third-party network 146 generally represents any suitable communication network(s) outside the system 100 (and therefore out of the control of the owners/operators of the system 100). The third-party network 146 could, for example, represent the Internet, a cellular communication network, or other network or combination of networks. The third-party server 148 represents a server used to provide notifications to end-user devices 150. For example, the third-party server 148 could push notifications to the end-user devices 150, allow retrieval of notifications by the end-user devices 150 at specified intervals or when requested, or provide notifications in any other suitable manner. The end-user devices 150 can then connect to the notification server 144 over the network 146 to receive details about notifications and events or to query for any notifications. As a particular example, the third-party server 148 could be used by companies like APPLE, SAMSUNG, or GOOGLE to provide push notifications or other notifications to mobile devices.

The end-user devices 150 denote any suitable user devices that can receive and present notifications to users. Examples of end-user devices 150 include smartphones, tablet computers, or other communication/computing devices. Specific examples could include APPLE IPHONEs, APPLE IPADs, and ANDROID devices.

Notifications sent to mobile user devices can be particularly useful during plant upsets when problems occur in an industrial facility. When analyzing what happened to cause or resolve a plant upset (often referred to as "triaging"), it is often helpful to know what types of notifications were sent out, who the notifications were sent to, when the notifications were sent, and when recipients viewed/read the notifications and became aware that an event was occurring. Without an automated mechanism, it may not be possible to know when a user was first notified of an event. Moreover, during plant upsets or at other times, multiple users could receive a notification related to an event, and one user may need or want to know if at least one other user has viewed/read the notification.

In accordance with this disclosure, upon receipt of a notification at an end-user device 150, a mobile application on the device 150 alerts a user to the new notification. The device 150 allows the mobile application to be opened/launched by the user and the event details to be reviewed by the user. When the user opens a notification, the mobile application automatically sends a read receipt to the notification server 144 indicating that the notification was viewed/read. This read receipt is stored by the notification server 144 and associated with the notification or event, allowing other users to query the stored data and identify who was made aware of a particular event and at what time each person became aware of the particular event.

In this way, it is possible to track who became aware of an issue and when, and this information could be used to help identify or explain the progression of a plant upset. Moreover, the transmission of read receipts by the mobile application on an end-user device 150 may not be disabled by the user. As a result, nothing may prevent the read receipts from being transmitted by the end-user device 150, which supports auditing of the notifications and the read receipts.

Although FIG. 1 illustrates one example of an industrial process control and automation system 100, various changes may be made to FIG. 1. For example, a control and automation system could include any number of sensors, actuators, controllers, operator stations, networks, servers, end-user devices, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which read receipts for notifications related to an industrial process control and automation system could be used. This functionality can be used in any other suitable system.

Figure 2:
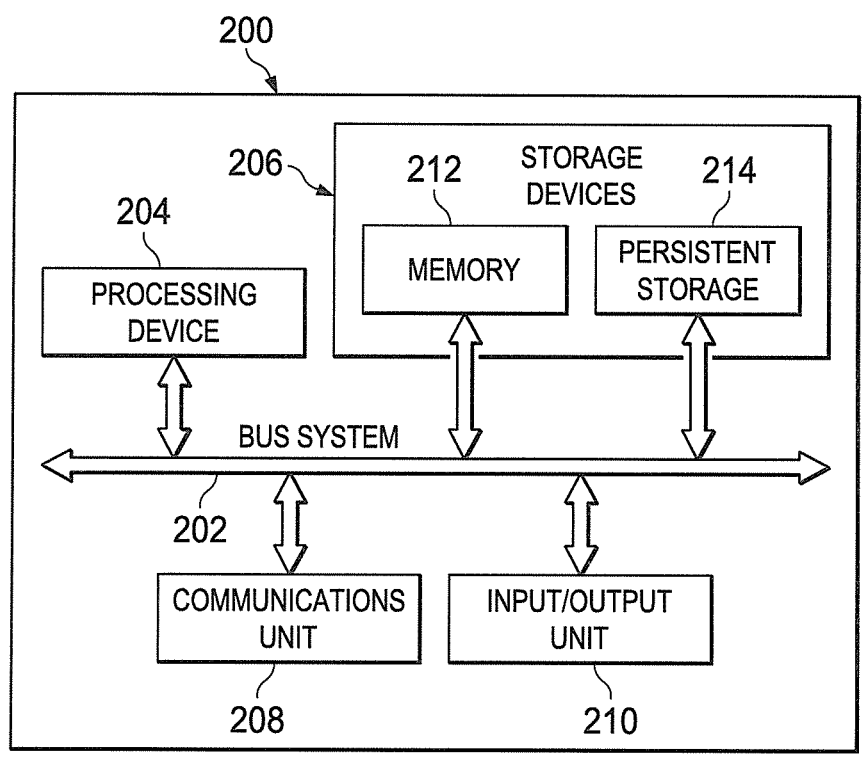
FIG. 2 illustrates an example device for automated event notification read receipt to support non-repudiated auditing or other functions in an industrial process control and automation system according to this disclosure.

FIG. 2 illustrates an example device 200 for automated event notification read receipt to support non-repudiated auditing or other functions in an industrial process control and automation system according to this disclosure. The device 200 could, for example, represent the notification server 144 or the end-user device 150 in the system 100 of FIG. 1. However, the notification server 144 or the end-user device 150 could be implemented using any other suitable device or system, and the device 200 could be used in any other suitable system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, or other network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

When implementing the notification server 144, the device 200 could execute instructions used to perform any of the functions associated with the notification server 144. For example, the device 200 could execute instructions that detect the occurrence of various events, such as by detecting warnings or alarms generated in the system 100, and that generate notifications associated with the events. The device 200 could also execute instructions used to process incoming read receipts for the notifications and to store the read receipts or information about the read receipts in association with the events or notifications. The device 200 could further execute instructions used to support querying of stored information related to read receipts and associated events or notifications. In addition, the device 200 could execute instructions used to inform various users of read receipts from other users.

When implementing the end-user device 150, the device 200 could execute instructions used to perform any of the functions associated with the end-user device 150. For example, the device 200 could execute instructions that process notifications and transmit read receipts when notifications are opened/viewed/read by a user.

Although FIG. 2 illustrates one example of a device 200 for automated event notification read receipt to support non-repudiated auditing or other functions in an industrial process control and automation system, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
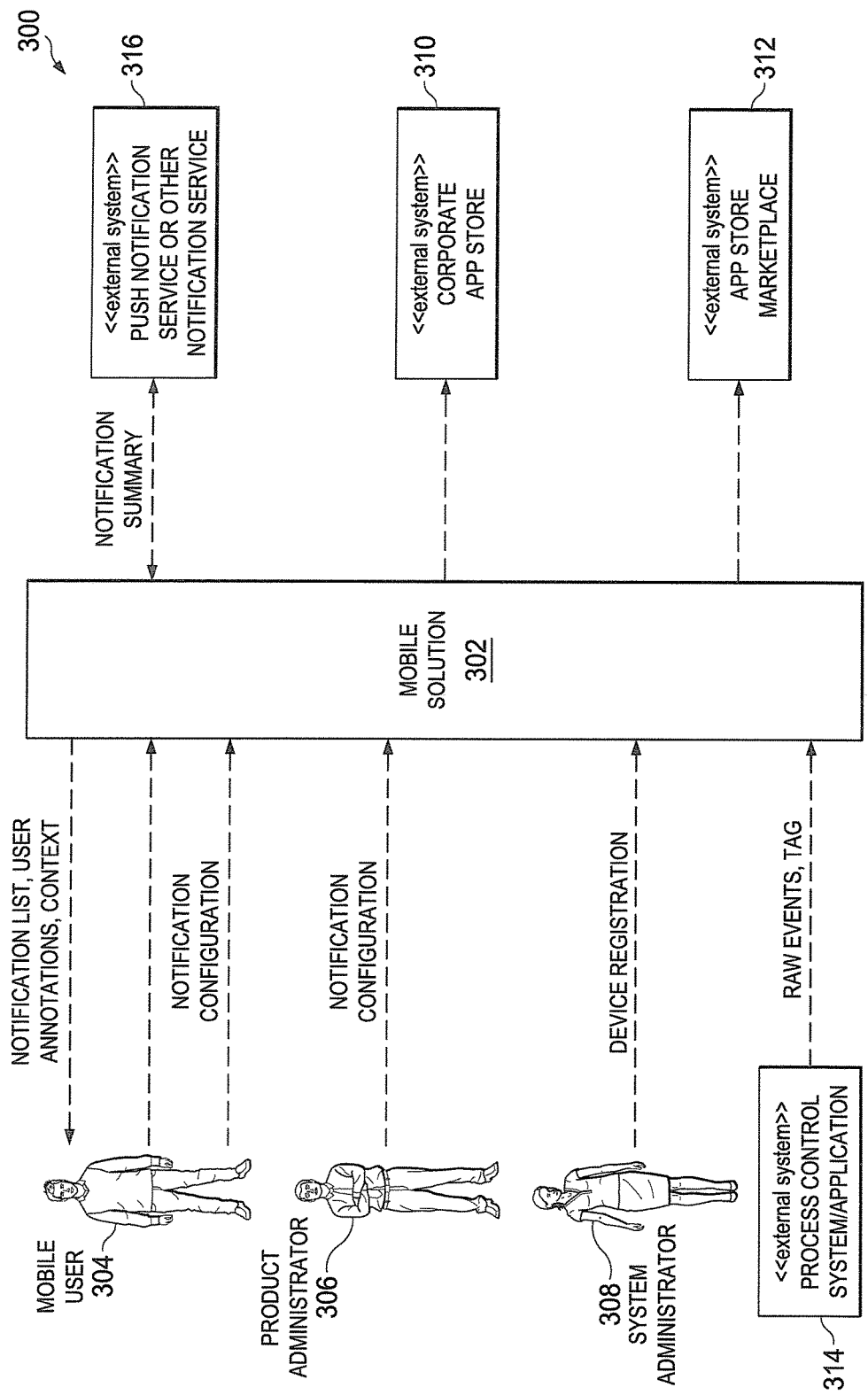
FIG. 3 illustrates an example context model for automated event notification read receipt to support non-repudiated auditing or other functions in an industrial process control and automation system according to this disclosure.

FIG. 3 illustrates an example context model 300 for automated event notification read receipt to support non-repudiated auditing or other functions in an industrial process control and automation system according to this disclosure. For ease of explanation, the context model 300 is described as being supported by the industrial process control and automation system 100 of FIG. 1. However, the context model 300 could be supported by any other suitable system.

As shown in FIG. 3, the context model 300 includes a mobile solution 302, which generally denotes at least part of the functionality of the notification server 144 and the application executed by the end-user devices 150. The mobile solution 302 interacts with three types of users 304-308 in this example, namely mobile users 304, product administrators 306, and system administrators 308. The mobile users 304 generally denote end users who use the end-user devices 150 to receive notifications and optionally act on those notifications. For example, the mobile users 304 could use the end-user devices 150 to review notifications regarding events in the industrial process control and automation system 100 and interact with other users to resolve undesirable or problematic situations in the system 100. Note, however, that the notifications could be used in any other suitable manner. The mobile users 304 could also have the ability to configure or control the notifications that are sent to those mobile users 304, such as by defining different rules used to generate the notifications.

The product administrators 306 represent users who configure the functionality of the mobile solution 302. For example, the product administrators 306 could define rules or other logic that control the generation of the notifications. As a particular example, the product administrators 306 could create rules that define the notifications sent in response to various events, the users who receive those notifications, and the contents of those notifications. In some embodiments, rules can be defined for different roles, and associations of users to those roles can be used to identify the mobile users 304 who receive notifications for those roles. As noted above, end users can also create their own rules for notifications, and the product administrators 306 could have the ability to review, modify, or delete the end user-created rules.

The system administrators 308 represent users who are responsible for allowing the mobile application executed by the end-user devices 150 to be authorized in their environment. For example, the system administrators 308 could grant permissions for end-user devices 150 to access the mobile solution 302 and register the end-user devices 150 with the mobile solution 302.

The application executed by the end-user devices 150 could be provided via an electronic store or marketplace, such as a corporate store 310 or a third-party store 312. Each electronic store 310-312 generally represents a computing system hosting one or more applications or "apps" that can be downloaded to the end-user devices 150. As the names imply, the corporate store 310 denotes a computing system operated by a corporation or other entity associated with the industrial process control and automation system 100 or other system. The third-party store 312 denotes a computing system operated by a third party unrelated to the industrial process control and automation system 100 or other system, such as APPLE or GOOGLE. End users can use their end-user devices 150 to access one or more of the electronic stores 310-312 and download an app that supports the use of notifications related to industrial process control and automation.

Once configured and placed into operation, the mobile solution 302 receives information about events from various sources, such as one or more process control systems or applications 314. Each process control system or application 314 could represent any component within the industrial process control and automation system 100 that can generate events or data indicative of events. In some instances, a process control system or application 314 can be designed to specifically integrate with the mobile solution 302, and the process control system or application 314 can itself provide events with or without tags (event-related information) to the mobile solution 302. In other instances, a process control system or application 314 may be unable to provide this information to the mobile solution 302 itself, and a plug-in or other mechanism can be used with the process control system or application 314 to identify events and transmit information to the mobile solution 302.

However the events are detected, the mobile solution 302 receives information about the events and uses rules or other logic to generate notifications for mobile users 304. The mobile solution 302 also sends the notifications to the end-user devices 150 of the mobile users 304. In some embodiments, the notifications are sent to the mobile users 304 directly via a third-party notification service 316, which could denote a service provided by the third-party server 148. The third-party notification service 316 could include an APPLE or ANDROID push notification service, although other push or non-push notification services could be used. The third-party notification service 316 provides the notifications to the end-user devices 150 used by the mobile users 304. Alternatively, the mobile solution 302 can generate obfuscated messages (such as unique alphanumeric codes, brief summaries, or other obfuscations) for the generated notifications, and the obfuscated messages can be sent to the third-party notification service 316 for delivery to the mobile users 304 as obfuscated notifications. The obfuscated notifications can be used by the end-user devices 150 to securely interact with the mobile solution 302 in order to obtain and present non-obfuscated notifications to the mobile users 304.

In whatever manner the notifications are provided to the end-user devices 150, the end-user devices 150 can present the notifications to the mobile users 304. For example, an end-user device 150 can receive and present a listing of notifications for a particular mobile user 304, where the listing identifies the notification messages, their associated identifiers, and some (or possibly all) of the fields of the notification messages. Annotations or other text-based communications associated with those notifications can also be provided to or received from the end-user device 150. Annotations could include communications such as comments from users or read receipts, forwarding indicators, or other system-generated annotations. In addition, context (such as detailed historical data for one or more process variables) can be provided to the end-user device 150. Note, however, that notifications can be used in any other suitable manner and that any other suitable data associated with the notifications can be sent to or received from the end-user devices 150.

Although FIG. 3 illustrates one example of a context model 300 for automated event notification read receipt to support non-repudiated auditing or other functions in an industrial process control and automation system, various changes may be made to FIG. 3. For example, additional types of users could be associated with the mobile solution 302, or functions of multiple user types could be combined. Also, while specific entities such as APPLE and ANDROID are described above, other stores or notification services could be used. In addition, various components could be added, omitted, combined, further subdivided, or placed in any other suitable configuration according to particular needs.

Figure 4:
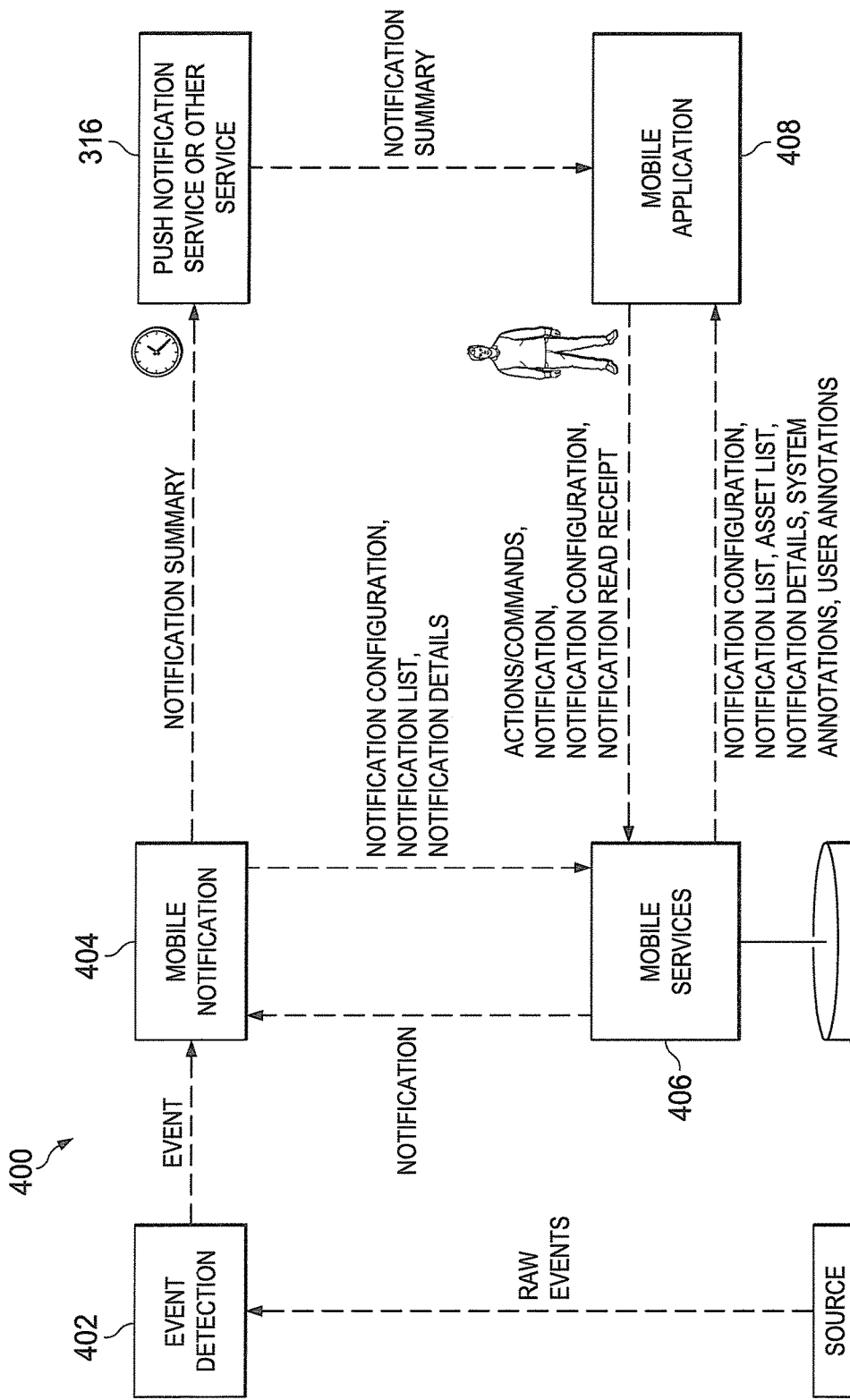
FIG. 4 illustrates an example system model for automated event notification read receipt to support non-repudiated auditing or other functions in an industrial process control and automation system according to this disclosure.

FIG. 4 illustrates an example system model 400 for automated event notification read receipt to support non-repudiated auditing or other functions in an industrial process control and automation system according to this disclosure. For ease of explanation, the system model 400 is described as being supported by the industrial process control and automation system 100 of FIG. 1. However, the system model 400 could be supported by any other suitable system. Also, in the following discussion, it is assumed that obfuscated notifications are sent to the end-user devices 150 via the third-party notification service 316 and that the end-user devices 150 request non-obfuscated notifications securely from the notification server 144. However, other mechanisms for providing notifications to the end-user devices 150 could be used, such as direct delivery of non-obfuscated notifications via the third-party notification service 316.

As shown in FIG. 4, the system model 400 includes an event detection unit 402, a mobile notification unit 404, and a mobile services unit 406. These units 402-406 could, for example, denote different functional units of the mobile solution 302. Each of the units 402-406 could be implemented using any suitable hardware or a combination of hardware and software/firmware instructions. For instance, each of the units 402-406 could be implemented using one or more software routines executed by the processing device(s) 204 of the notification server 144.

The event detection unit 402 receives information associated with events, such as from one or more process control systems or applications 314. The information associated with the events could include information such as a time of an event, a source of the event, a condition associated with the event, a category (such as minor, major, or critical) of the event, and a description of the event. The event detection unit 402 can obtain the information about the events in any suitable manner. For example, the event detection unit 402 could poll the process control systems or applications 314 at specified intervals, in response to triggering events, or at other times. The event detection unit 402 could also receive the information from plug-ins or other data collection components in or associated with the process control systems or applications 314 at specified intervals, in response to triggering events, or at other times. The events here could represent all events generated by the process control systems or applications 314 or only a subset of events generated by the process control systems or applications 314 (such as only certain types of events). The event detection unit 402 processes the information and outputs information identifying the events, such as in a standard format, to the mobile notification unit 404.

The mobile notification unit 404 receives the information identifying the events from the event detection unit 402 and generates obfuscated notifications for end-user devices 150. For example, the mobile notification unit 404 can generate non-obfuscated notifications containing suitable information about the events, generate unique identifiers for the non-obfuscated notifications, and generate obfuscated notifications that include the unique identifiers. The obfuscated notifications (referred to in FIG. 4 as notification summaries) are sent to the third-party notification service 316 for delivery to mobile applications 408. The mobile applications 408 represent an application executed by one or more end-user devices 150. The mobile notification unit 404 also provides various information, such as lists of notifications and the notifications themselves, to the mobile services unit 406.

The mobile services unit 406 interacts with each mobile application 408 securely, such as by using Virtual Private Network (VPN) or other secure communication protocol. The mobile services unit 406 performs various functions related to notifications. For example, the mobile services unit 406 could receive unique identifiers or other obfuscations from the mobile applications 408, retrieve non-obfuscated notifications associated with those obfuscations, and provide the non-obfuscated notifications to the mobile applications 408. The mobile services unit 406 can also manage lists of notifications that particular users have received, manage read-receipts for notifications that are read or viewed on the users' end-user devices 150, and allow rules to be configured by the end-user devices 150. The mobile services unit 406 can further provide user-generated or system-generated annotations to the end-user devices 150 and receive user annotations from end-user devices 150 for delivery to other end-user devices 150. In addition, the mobile services unit 406 can receive invocations of various commands from the end-user devices 150, such as commands for obtaining historical data, user comments, or other information about a specific notification.

The mobile applications 408 executed by the end-user devices 150 generate read receipts for notifications and transmit those read receipts to the mobile services unit 406. The mobile services unit 406 can then use those read receipts in any suitable manner. For example, the mobile services unit 406 can store the read receipts in association with events or notifications in a database 410 or other data storage device. This may allow, for instance, queries to be performed involving the read receipt data, such as during "triaging" to identify what occurred during a plant upset and when users first learned of an event. The mobile services unit 406 can also provide read receipt indicators to the mobile users 304. This may allow, for example, multiple users who receive a notification to identify what other users have viewed/read the notification. As noted above, the transmission of read receipts by the mobile applications 408 could be permanently enabled or at least not able to be disabled by the mobile users 304, helping to ensure that read receipts are accurately collected in the system.

Although FIG. 4 illustrates one example of a system model 400 for automated event notification read receipt to support non-repudiated auditing or other functions in an industrial process control and automation system, various changes may be made to FIG. 4. For example, various components could be added, omitted, combined, further subdivided, or placed in any other suitable configuration according to particular needs. Also, various components in FIG. 4 (such as components 402-406) could be implemented using a common device, or at least some of those components could be implemented using different devices.

Figure 5:
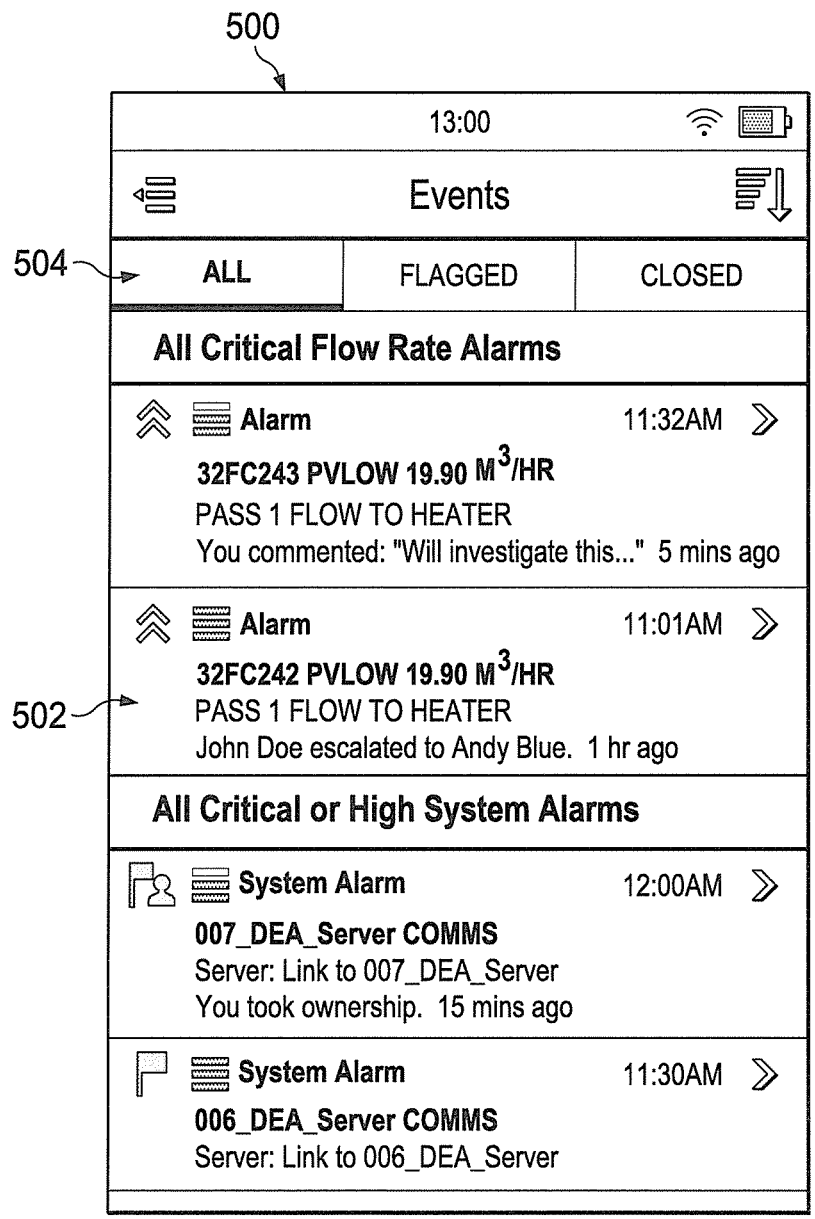
FIGS. 5 through 8 illustrate example notifications related to an industrial process control and automation system according to this disclosure.

FIGS. 5 through 8 illustrate example notifications related to an industrial process control and automation system according to this disclosure. As shown in FIG. 5, a graphical user interface 500 can be presented by the mobile application 408 on the display screen of an end-user device 150. The graphical user interface 500 here includes a listing of notifications 502. Each notification 502 includes various details about an event, such as a name and severity of the event, a time of the notification, and comments about the event. As shown in this example, the notifications 502 are grouped into different categories, although other categories or arrangements could be used. The graphical user interface 500 also includes various controls 504, such as controls for viewing all notifications, flagged notifications, or closed notifications and controls for changing the viewing arrangement.

Figure 6:
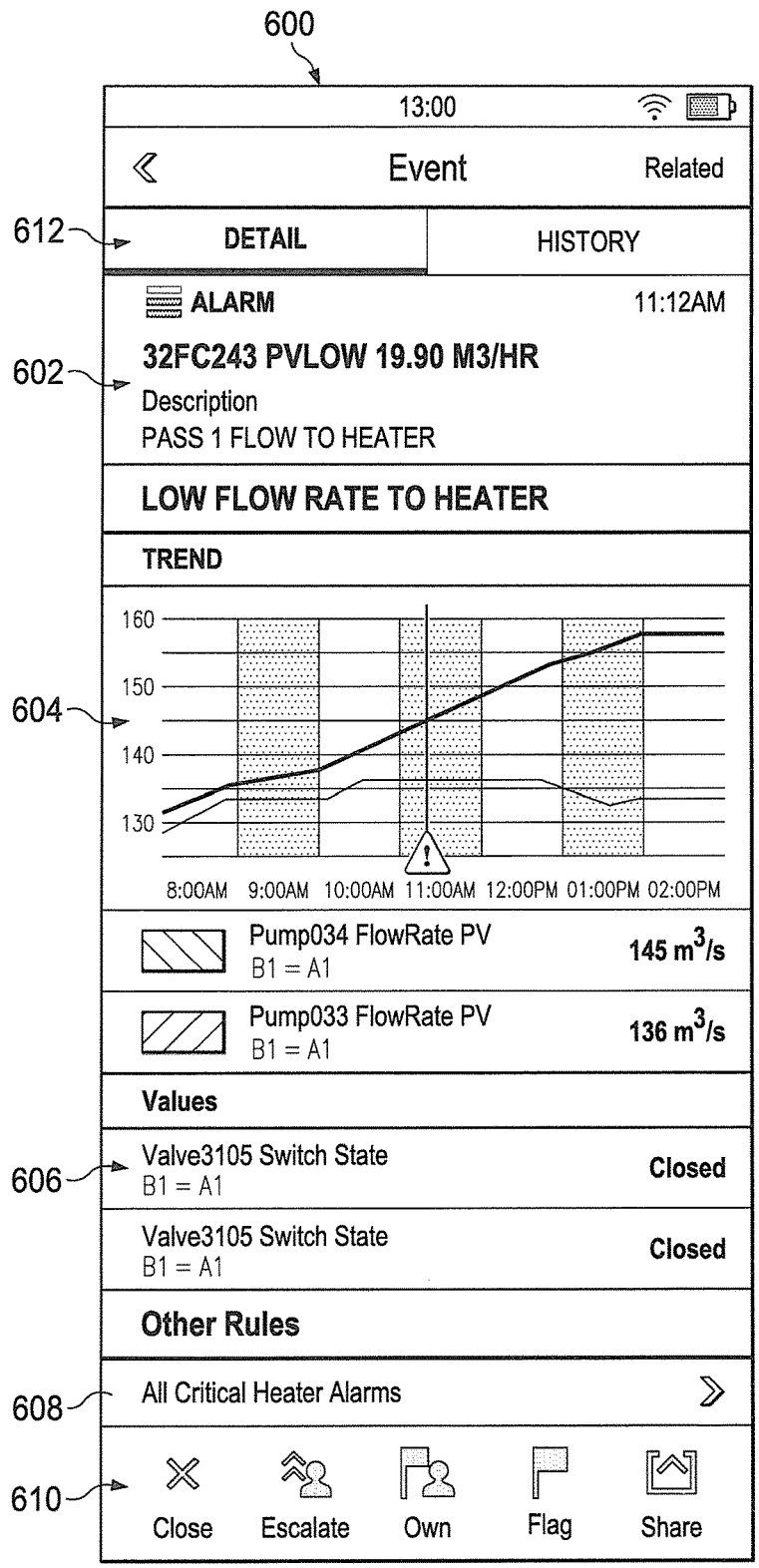

Selection of a specific notification 502 in the graphical user interface 500 for the first time could cause the mobile application 408 to transmit a read receipt to the notification server 144. Also, selection of a specific notification 502 in the graphical user interface 500 could cause the mobile application 408 to present a graphical user interface 600 as shown in FIG. 6. The graphical user interface 600 includes information 602 identifying a particular event and a trend diagram 604 showing historical values of one or more process variables associated with the particular event. The graphical user interface 600 also includes specific process variable values 606 associated with the event and an identification of the rule(s) 608 that triggered the notification or that are related to the notification. Moreover, the graphical user interface 600 includes controls 610 that allow a user to close a notification, escalate the notification to one or more specific users, own the notification (meaning the user will be responsible for resolving the event), flag the notification (so it appears as a flagged notification in FIG. 5), or share the notification with other users.

Figure 7:
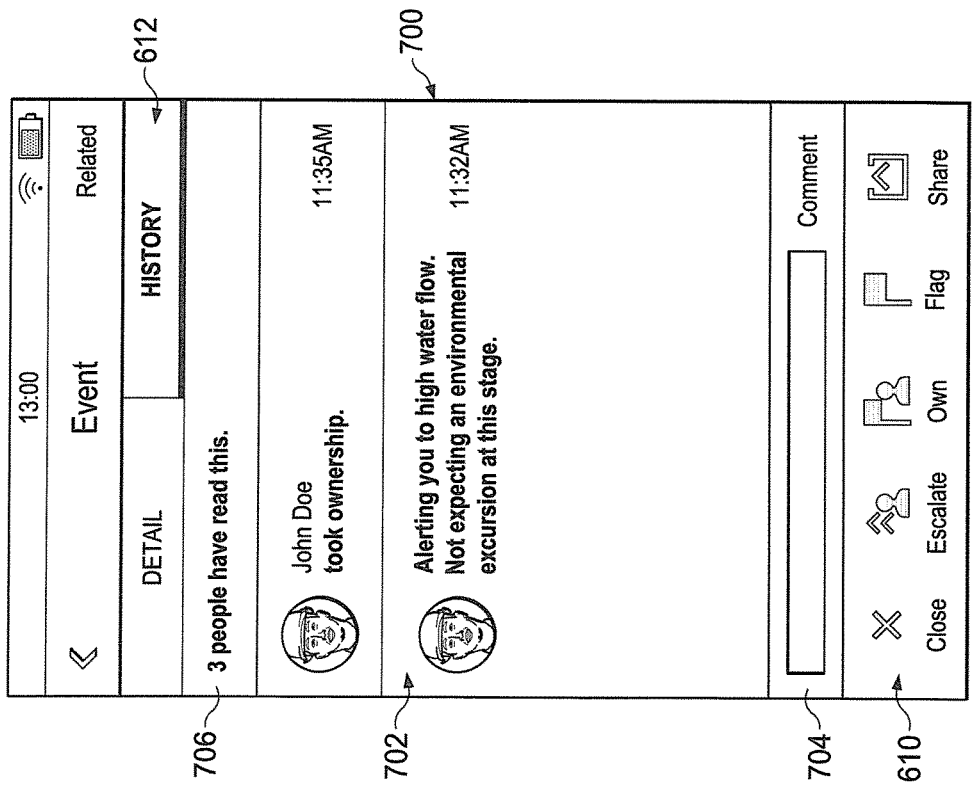

In addition, the graphical user interface 600 includes tabs 612 that can be used to select whether detailed information or historical information associated with the selected notification is being presented to the user. In FIG. 6, the "Detail" tab has been selected. Selection of the "History" tab can present content in a graphical user interface 700 as shown in FIG. 7. The graphical user interface 700 here includes the controls 610 and the tabs 612. The graphical user interface 700 also identifies any user comments 702 associated with the selected notification, along with a text entry box 704 that allows entry of a comment related to the selected notification. Any comment entered through the text entry box 704 can be sent from the end-user device 150 to the notification server 144 for delivery to other users who receive the notification.

Figure 8:
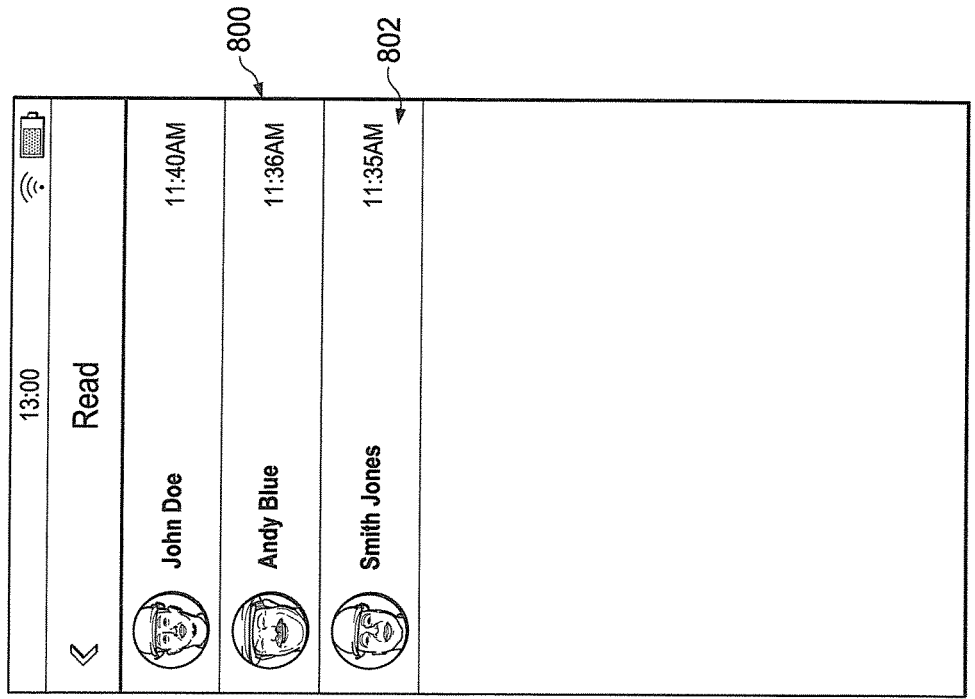

The graphical user interface 700 further includes a read receipt summary 706, which identifies the number of users who have viewed/read the selected notification. The read receipt summary 706 can represent a link, which can be selected by the user to view a graphical user interface 800 as shown in FIG. 8. As shown in FIG. 8, the graphical user interface 800 includes a listing of read receipts 802 identifying the users who have viewed/read the selected notification. Each read receipt 802 here identifies a specific user and a time when the user first viewed/read the associated notification.

In this way, the mobile application 408 supports the use of read receipts with notifications related to an industrial process control and automation system. Among other things, this allows users to easily determine who has read particular notifications. As noted above, this also allows auditing or other analyses to occur, such as to learn what happened during a plant upset. Because the mobile application 408 could be designed or configured to prevent mobile users 304 from deactivating the read receipt transmission functionality, this can help to ensure that accurate read receipts are collected in the system.

Note that in some implementations, a notification can be updated in response to various actions. For example, a notification could be updated each time a user comments on the notification and that comment is provided to other users. In some embodiments, a read receipt is only generated the first time a user views/reads a notification. If that notification is later updated, an indicator associated with the notification could be changed to show that an update has occurred, but no read receipt may be generated if and when the updated notification is viewed/read. Of course, read receipts could be generated when a user views an original notification and when the user views any updated versions of the notification, as well.

Although FIGS. 5 through 8 illustrate examples of notifications related to an industrial process control and automation system, various changes may be made to FIGS. 5 through 8. For example, the content and arrangement of each graphical interface are for illustration only. Also, while shown as being used with an APPLE IPHONE, the notifications could be used with any other suitable devices.

Figure 9:
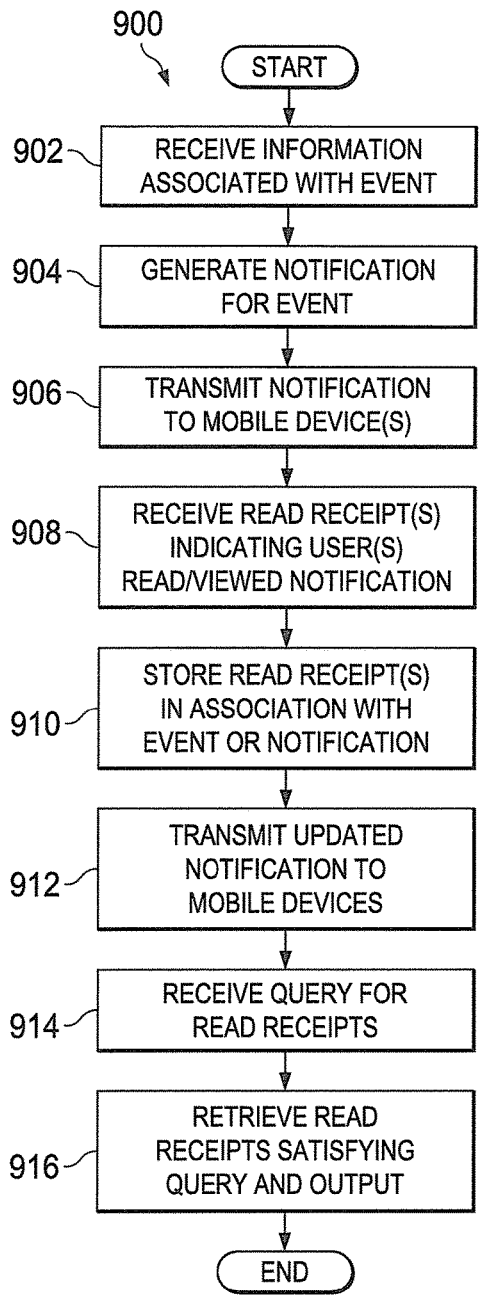
FIGS. 9 and 10 illustrate example methods for automated event notification read receipt to support non-repudiated auditing or other functions in an industrial process control and automation system according to this disclosure.
Figure 10:
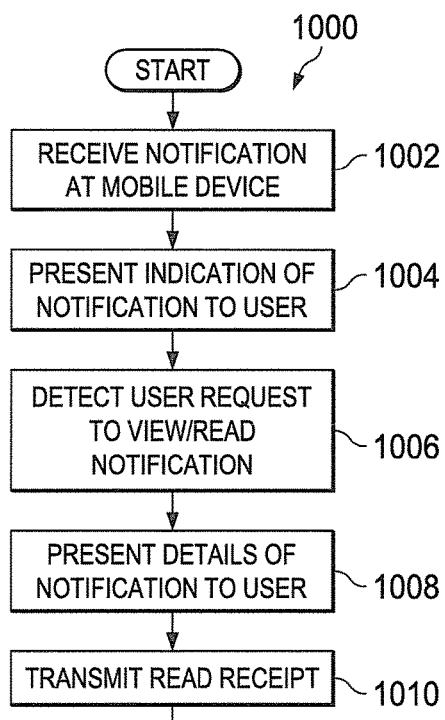

FIGS. 9 and 10 illustrate example methods 900 and 1000 for automated event notification read receipt to support non-repudiated auditing or other functions in an industrial process control and automation system according to this disclosure. In particular, the method 900 could be performed by the notification server 144 or other device(s) within an industrial control and automation system, and the method 1000 could be performed by an end-user device 150. However, each method could be performed using any other suitable device or system.

As shown in FIG. 9, information associated with an event is received at step 902. This could include, for example, the mobile notification unit 404 receiving data from the event detection unit 402, where the data identifies an event that has occurred. A notification associated with the event is generated at step 904. This could include, for example, the mobile notification unit 404 using one or more rules to identify one or more users to receive a notification associated with the event. Each rule could identify the condition(s) to be met in order to satisfy the rule and the contents of a notification to be generated if the condition(s) is/are satisfied.

The notification is transmitted to one or more mobile devices at step 906. This could include, for example, the mobile notification unit 404 generating a unique identifier or other obfuscation for the notification and interacting with the third-party notification service 316 to transmit the obfuscation as part of an obfuscated notification to one or more end-user devices 150. This could also include the mobile services unit 406 establishing a VPN or other secure connection with the end-user devices 150 and providing a non-obfuscated notification to the end-user devices 150. Note, however, that the use of obfuscation and obfuscated notifications is not required, and the mobile notification unit 404 or the mobile services unit 406 could provide a non-obfuscated notification to the end-user devices 150 via the third-party notification service 316 or in some other manner.

At least one read receipt indicating that at least one user has read/viewed the notification is received at step 908 and stored in association with the event or notification at step 910. This could include, for example, the mobile services unit 406 receiving the read receipt from each end-user device 150 at which a user used the mobile application 408 to view/read the notification. This could also include the mobile services unit 406 storing information about the read receipt(s) in the database 410.

The stored information about the read receipts could be used in any suitable manner. For example, information about the read receipts can be sent to one or more mobile devices at step 912. This could include, for instance, the mobile services unit 406 transmitting information identifying how many users have viewed/read the notification to a particular end-user device 150 for inclusion in the read receipt summary 706 displayed at that particular end-user device 150. This could also include the mobile services unit 406 transmitting information identifying the specific users who have viewed/read the notification for inclusion in the graphical user interface 800 displayed at that particular end-user device 150.

As another example, a query for read receipts could be received at step 914, and information about read receipts that satisfy the query could be retrieved and output at step 916. This could be done by the mobile services unit 406 or any other suitable component configured to access and use the database 410. This could include, for example, receiving a query for any read receipts that satisfy one or more query parameters, identifying any read receipts that satisfy the query parameter(s), and returning the identified read receipt(s).

As shown in FIG. 10, a notification is received at a mobile device at step 1002. This could include, for example, a mobile application 408 on an end-user device 150 receiving an obfuscated notification containing a unique identifier or other obfuscation from the third-party server 148 via the third-party notification service 316. This could also include the end-user device 150 establishing a secure connection to the notification server 144 and transmitting a request (possibly including the unique identifier or other obfuscation)

over the secure connection to the notification server 144. This could further include the end-user device 150 receiving a non-obfuscated notification over the secure connection. Note, however, that the use of unique identifiers and obfuscated notifications is not required, and the end-user device 150 could receive a non-obfuscated notification via the third-party notification service 316 or in some other manner.

An indication of the notification is presented to a user at step 1004. This could include, for example, the mobile application 408 presenting a pop-up message or other message on the screen of the end-user device 150. This could also include the mobile application 408 including the notification in a list of notifications presented in the graphical user interface 500. A request to view/read the notification is detected at step 1006. This could include, for example, the mobile application 408 detecting the user selecting the message presented on the screen of the end-user device 150. This could also include the mobile application 408 detecting the user selecting the notification from the list of notifications in the graphical user interface 500. Once selected, details of the notification are presented to the user at step 1008. This could include, for example, the mobile application 408 presenting the graphical user interface 600 to the user, where the graphical user interface 600 contains details of the selected notification.

The mobile device transmits a read receipt for the notification at step 1010. This could include, for example, the mobile application 408 transmitting a message to the notification server 144, where the message identifies the notification, a time when the notification was viewed/read, the user who viewed/read the notification, or any other or additional information.

In this way, the system is able to keep track of when various users actually viewed/read notifications, rather than simply tracking when the notifications were sent to the users. This allows auditing, post-upset analysis, or other functions to occur using the read receipt information. In addition, the inability for mobile users 304 to disable the read receipt functionality can help to ensure that accurate information about the notifications can be captured.

Although FIGS. 9 and 10 illustrate examples of methods 900 and 1000 for automated event notification read receipt to support non-repudiated auditing or other functions in an industrial process control and automation system, various changes may be made to FIGS. 9 and 10. For example, while each figure shows a series of steps, various steps in each figure could overlap, occur in parallel, occur in a different order, or occur any number of times. Also, each method could include any number of events, notifications, and read receipts.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, at a notification server, an event related to at least one of an activity or condition of a component in an industrial process control and automation system;
   generating, by the notification server, a notification based on the event related to the at least one of the activity or condition of the component;
   transmitting, by the notification server, the notification to a first end-user device, the notification associated with the event in the industrial process control and automation system;
   receiving, at the notification server, a first read receipt indicating that a user of the first end-user device opened the notification or viewed or read details about the notification at the first end-user device;

storing, at the notification server, the first read receipt or information related to the first read receipt in association with at least one of: the notification and the event;

receiving, by the notification server, a query for read receipts satisfying one or more parameters; wherein the notification server identifies any read receipts that satisfy the one or more parameters in response to the query for read receipts satisfying one or more parameters; and receiving, by the notification server, a command corresponding to the notification from the first end-user device, wherein the command indicates that the user has assumed responsibility for the event.

2. The method of claim 1, further comprising:
transmitting, by the notification server, the notification to a second end-user device; and
transmitting, by the notification server, a first indication to the second end-user device, the first indication indicating that the user of the first end-user device opened the notification or viewed or read the details about the notification.

3. The method of claim 2, further comprising:
receiving, at the notification server, a second read receipt indicating that a user of the second end-user device opened the notification or viewed or read the details about the notification at the second end-user device; and
storing, by the notification server, the second read receipt or information related to the second read receipt in association with at least one of: the notification and the event.

4. The method of claim 3, further comprising:
transmitting, by the notification server, a second indication to the first end-user device, the second indication indicating that the user of the second end-user device opened the notification or viewed or read the details about the notification.

5. The method of claim 1, wherein the notification is transmitted to the first end-user device via a secure communication channel.

6. The method of claim 1, further comprising:
transmitting, by the notification server, a list identifying multiple notifications to the first end-user device; and
transmitting, by the notification server, the details about the notification to the first end-user device in response to the user's selection of the notification in the list.

7. An apparatus comprising:
at least one interface configured to communicate with a first end-user device; and
at least one processing device configured to:
receive an event related to at least one of an activity or condition of a component in an industrial process control and automation system;
generate a notification based on the event related to the at least one of the activity or condition of the component;
initiate transmission of the notification to the first end-user device, the notification associated with the event in the industrial process control and automation system;
receive a first read receipt indicating that a user of the first end-user device opened the notification or viewed or read details about the notification at the first end-user device;
store the first read receipt or information related to the first read receipt in association with at least one of: the notification and the event;
receive a query for read receipts satisfying one or more parameters, wherein the at least one processing device identifies any read receipts that satisfy the one or more parameters in response to the query for read receipts satisfying one or more parameters; and
receive a command corresponding to the notification from the first end-user device, wherein the command indicates that the user has assumed responsibility for the event.

8. The apparatus of claim 7, wherein the at least one processing device is further configured to:
initiate transmission of the notification to a second end-user device; and
initiate transmission of a first indication to the second end-user device, the first indication indicating that the user of the first end-user device opened the notification or viewed or read the details about the notification.

9. The apparatus of claim 8, wherein the at least one processing device is further configured to:
receive a second read receipt indicating that a user of the second end-user device opened the notification or viewed or read the details about the notification at the second end-user device; and
store the second read receipt or information related to the second read receipt in association with at least one of: the notification and the event.

10. The apparatus of claim 9, wherein the at least one processing device is further configured to:
initiate transmission of a second indication to the first end-user device, the second indication indicating that the user of the second end-user device opened the notification or viewed or read the details about the notification.

11. The apparatus of claim 7, wherein the at least one interface is configured to transmit the notification to the first end-user device via a secure communication channel.

12. The apparatus of claim 7, wherein the at least one processing device is further configured to:
initiate transmission of a list identifying multiple notifications to the first end-user device; and
initiate transmission of the details about the notification to the first end-user device in response to the user's selection of the notification in the list.

13. A non-transitory computer readable medium containing computer readable program code that, when executed, causes at least one processing device to:
receive an event related to at least one of an activity or condition of a component in an industrial process control and automation system;
generate a notification based on the event related to the at least one of the activity or condition of the component;
initiate transmission of the notification to a first end-user device, the notification associated with the event in the industrial process control and automation system;
receive a first read receipt indicating that a user of the first end-user device opened the notification or viewed or read details about the notification at the first end-user device;
store the first read receipt or information related to the first read receipt in association with at least one of: the notification and the event;
receive a query for read receipts satisfying one or more parameters, wherein the at least one processing device identifies any read receipts that satisfy the one or more parameters in response to the query for read receipts satisfying one or more parameters; and receive a command corresponding to the notification from the first end-user device, wherein the command indicates that the user has assumed responsibility for the event.

14. The non-transitory computer readable medium of claim 13, further containing computer readable program code that, when executed, causes the at least one processing device to:
   initiate transmission of the notification to a second end-user device; and
   initiate transmission of a first indication to the second end-user device, the first indication indicating that the user of the first end-user device opened the notification or viewed or read the details about the notification.

15. The non-transitory computer readable medium of claim 14, further containing computer readable program code that, when executed, causes the at least one processing device to:
   receive a second read receipt indicating that a user of the second end-user device opened the notification or viewed or read the details about the notification at the second end-user device; and
   store the second read receipt or information related to the second read receipt in association with at least one of: the notification and the event.

16. The non-transitory computer readable medium of claim 15, further containing computer readable program code that, when executed, causes the at least one processing device to:
   initiate transmission of a second indication to the first end-user device, the second indication indicating that the user of the second end-user device opened the notification or viewed or read the details about the notification.

17. A non-transitory computer readable medium containing computer readable program code that, when executed, causes at least one processing device of a mobile device to:
   receive a notification associated with an event in an industrial process control and automation system at the mobile device, wherein the event is related to at least one of an activity or condition of a component in the industrial process control and automation system, and wherein the notification is generated based on the event related to the at least one of the activity or condition of the component;
   receive a user input associated with the notification at the mobile device, the user input comprising a request to open the notification or to view or read details about the notification;
   in response to the user input, present the details about the notification to a user and transmit a read receipt associated with the notification from the mobile device, the read receipt indicating that the user opened the notification or viewed or read the details about the notification;
   receive a query for read receipts satisfying one or more parameters, wherein the at least one processing device identifies any read receipts that satisfy the one or more parameters in response to the query for read receipts satisfying one or more parameters; and
   receive a command corresponding to the notification at the mobile device, wherein the command indicates that the user has assumed responsibility for the event.

18. The non-transitory computer readable medium of claim 17, wherein the computer readable program code that, when executed, causes the at least one processing device to transmit the read receipt comprises:
   computer readable program code that, when executed, causes the at least one processing device to prevent the user from disabling the transmission of the read receipt.

19. The method of claim 1, wherein the first read receipt identifies when the user of the first end-user device first opened the notification or first viewed or read details about the notification at the first end-user device.

* * * * *